No. 676,654. Patented June 18, 1901.
J. FRANCOEUR.
HEADED GRAIN STACKER.
(Application filed Feb. 14, 1901.)

(No Model.) 2 Sheets—Sheet 1.

Witnesses
C. H. Walker.
J. W. Garner.

J. Francoeur, Inventor
by C. A. Snow & Co.
Attorneys

No. 676,654.
Patented June 18, 1901.
J. FRANCOEUR.
HEADED GRAIN STACKER.
(Application filed Feb. 14, 1901.)
(No Model.)
2 Sheets—Sheet 2.
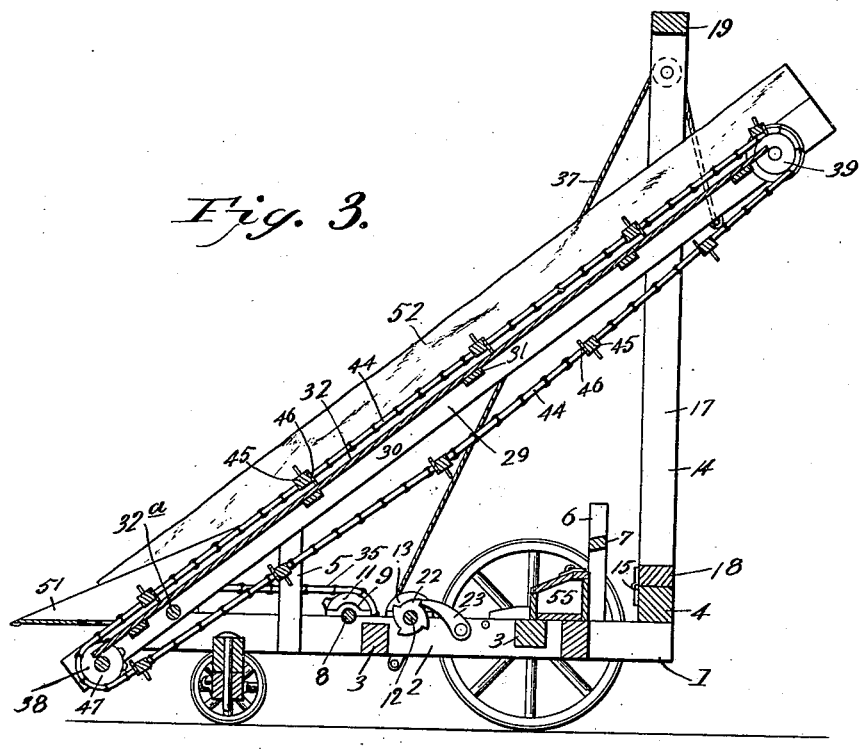
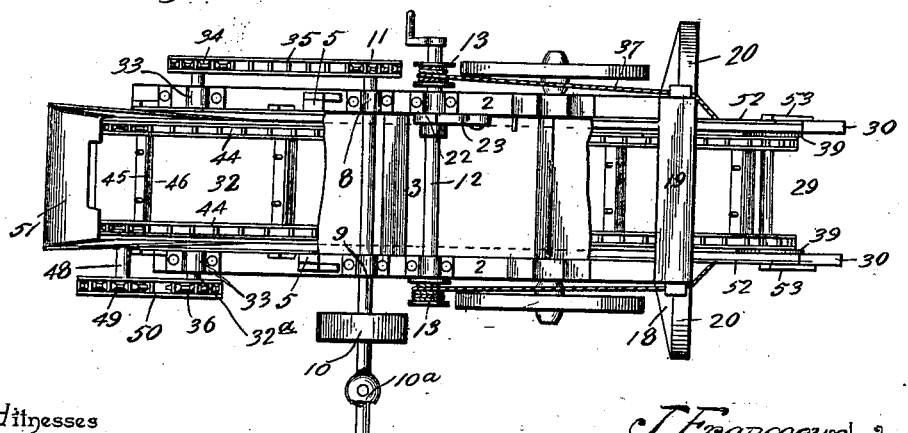

UNITED STATES PATENT OFFICE.

JOSEPH FRANCOEUR, OF CONCORDIA, KANSAS, ASSIGNOR OF ONE-HALF TO GAMELISE NOURIE, OF SAME PLACE.

HEADED-GRAIN STACKER.

SPECIFICATION forming part of Letters Patent No. 676,654, dated June 18, 1901.

Application filed February 14, 1901. Serial No. 47,317. (No model.)

*To all whom it may concern:*

Be it known that I, JOSEPH FRANCOEUR, a citizen of the United States, residing at Concordia, in the county of Cloud and State of Kansas, have invented a new and useful Headed-Grain Stacker, of which the following is a specification.

My invention relates to an improvement in machines for stacking headed grain, hay, millet, cane, and the like; and it consists in the peculiar construction and combination of devices hereinafter set forth and claimed.

Figure 1:
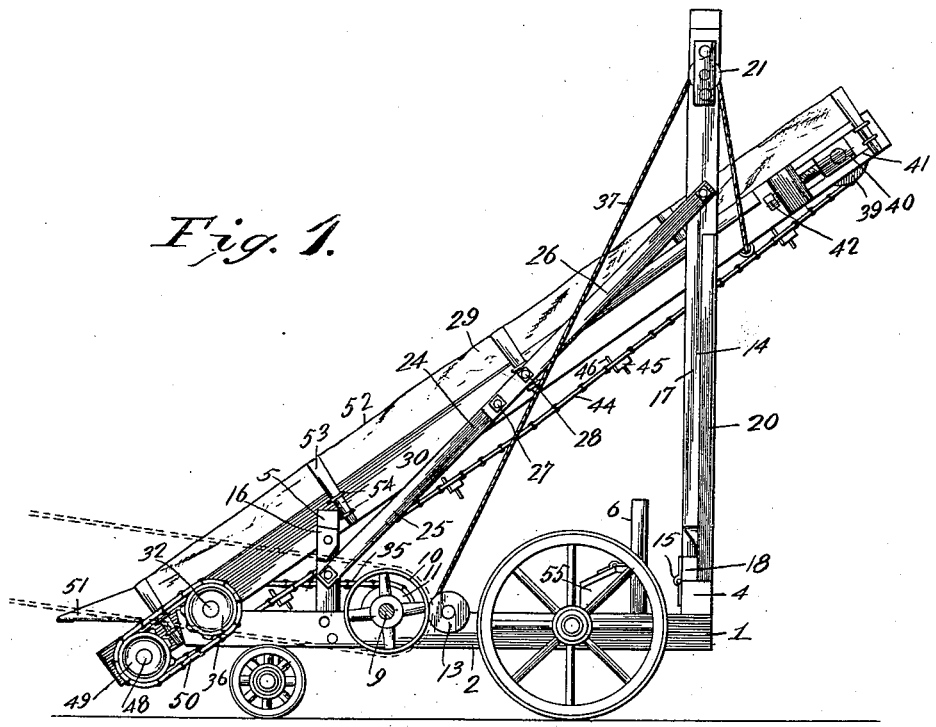
Figure 2:
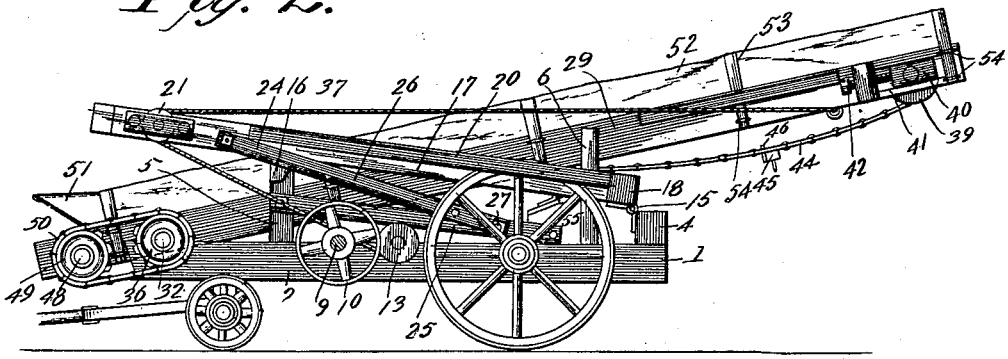

In the accompanying drawings, Figure 1 is a side elevation of a stacker embodying my improvements, showing the same in operative position. Fig. 2 is a similar view of the same, showing the hoisting-frame and the conveyer-frame lowered. Fig. 3 is a vertical longitudinal sectional view of the same. Fig. 4 is a top plan view of the same, the central portion of the conveyer-frame being removed to disclose subjacent mechanism.

The wheeled frame 1, which supports the stacker, may be of any suitable construction.
As here shown, the same comprises a pair of side beams 2, connected together by cross-bars 3. At the rear end of the frame is a bolster-bar 4. A pair of standards 5 rise from the side beams 2 at a suitable distance from the front ends thereof. A pair of standards 6 rise fom the said beams 2 near their rear ends and are connected together by a cross-bar 7. The said standards 6 and cross-bar 7 constitute a gallows-frame. A shaft 8 is journaled in bearings 9 on the beams 2. The said shaft is provided at one end with a power-pulley 10 and has a sprocket-wheel 11 at the opposite end. A winch 12 is mounted in bearings on the said beams 2 and is provided at opposite ends with drums 13.

On the bolster-bar 4 at the rear end of frame 1 is mounted a hoisting-frame 14, which is hinged to the bolster-bar, as at 15, and is adapted to be turned downward and folded forward on the frame 1, and is supported when thus lowered by cleats or blocks 16 on the outer sides of the standards 5. The said hoisting-frame comprises a pair of studs 17, connected together at their lower ends by a sill 18 and connected together at their upper ends by a plate 19. Suitable side braces 20 connect the extended ends of the sill to the studs, as shown, and brace the hoisting-frame laterally. The said hoisting-frame is provided with a pair of direction-sheaves 21, which are disposed on the outer sides of the studs near the upper side of the hoisting-frame, as shown. The winch is provided with the usual ratchet 22 engaged by a pawl 23.

A pair of brace-bars 24 connect the standards 5 and the studs 17 of the hoisting-frame. The said brace-bars are pivotally bolted to the said standards and to the said studs, and each of the said brace-bars comprises a pair of sections 25 26, which overlap each other and are connected together by bolts 27 28. When one of the said bolts is removed, a hinged joint is formed between the two sections of the brace-bar. Thereby the said brace-bars may be folded, as shown in Fig. 2, when the hoisting-frame is lowered. It will be understood that the function of the brace-bars 24 is to maintain the hoisting-frame in a vertical position, as shown in Figs. 1 and 3, when the machine is in operation.

The conveyer-frame 29 comprises the side bars 30, the cross-bars 31, connecting the same, and the floor 32, laid on the said cross-bars and extending nearly to the ends of the conveyer-frame. The lower front end of the conveyer-frame is disposed between the front ends of the side beams 1 and is pivotally mounted on a shaft 32, which is journaled in bearings 33 on the said beams. At one end of the said shaft is a sprocket-wheel 34, which is connected to the sprocket-wheel 11 by an endless sprocket-chain 35. On the opposite end of said shaft 32 is a sprocket-wheel 36. The free end of the conveyer-frame extends through the hoisting-frame and is adapted to be raised and lowered in the latter by ropes 37, which operate on the sheaves 21, and at their respective ends are connected to the conveyer-frame and to the drums of the winch. At opposite ends of the conveyer-frame are rollers 38 39. The latter is journaled in movable bearing-blocks 40, which operate in guideways 41 at the free outer end of the conveyer-frame, and the latter is provided also with adjusting-bolts 42, by means of which the said bearings 40 may be adjusted in order to tighten or loosen the endless conveyer 43, which connects the rollers 38 39. The said endless conveyer comprises endless sprocket-chains 44, made of separable links, cross-bars, or flights 45, which connect the said endless chains and sweeps 46, attached to the said flights, and which bear on the floor of the conveyer-frame, and in moving upward thereon coact with the flights in the elevation of the headed grain, hay, millet, cane, or the like. The said sweeps are made of leather or other suitable flexible material. The endless sprocket-chains 44 are engaged by suitable sprocket-wheels 47, with which the rollers 38 39 are provided. The roller 38 is provided at one end with an extended shaft 48, which carries a sprocket-wheel 49. An endless sprocket-chain 50 connects the sprocket-wheels 36 and 48, and hence conveys power from the shaft 32 to the endless traveling conveyer. The latter, as will be understood, serves to elevate the material thrown thereon or fed thereto from a suitable header and deposits the material on the stack.

At the lower end of the elevator-frame is a hopper 51. In order to prevent the grain, hay, millet, cane or the like from escaping over the sides of the elevator-frame when the machine is in operation, I provide guards 52, which are made of canvas or other suitable material and are supported by standards 53, which engage keepers 54 on the sides of the conveyer-frame. When the latter is lowered to inoperative position, as shown in Fig. 2, its free end is supported on the cross-bar 7 of the gallows-frame. In the form of my invention here shown I provide a tool-box 55, which is disposed immediately in front of the gallows-frame.

While the power-shaft 8 has been here shown as provided with a pulley 10, it will be understood that any other suitable means may be employed to drive said shaft. For instance, if the stacker is to be driven by a horse-power machine the tumbling-rod will be connected to the said shaft 8, as shown at 10ª in Fig. 4.

Having thus described my invention, I claim—

1. In a stacker of the class described, the combination of a wheeled supporting-frame having standards 5 near its front end provided with rests 16, a hoisting-frame hinged on the supporting-frame and adapted to be lowered and disposed on the said rests, a conveyer-frame having one end pivotally mounted at the front end of the supporting-frame, the free end of said conveyer-frame extending through the hoisting-frame, and jointed brace-bars connecting the standards 5 and the sides of the hoisting-frame, substantially as described.

2. In a stacker of the class described, the combination of a wheeled supporting-frame, a hoisting-frame at the rear end thereof provided with direction-sheaves, a conveyer-frame, a power-shaft pivotally connecting the latter near one end to the front end of the supporting-frame, the free end of said conveyer-frame extending through said hoisting-frame, a winch on the supporting-frame, hoisting-ropes connecting the said winch and the conveyer-frame, said ropes engaging the sheaves on the latter, supporting-rollers at the ends of the conveyer-frame, an endless traveling conveyer connecting the said rollers, and means connecting the power-shaft to one of said rollers, for the purpose set forth, substantially as described.

3. In a stacker of the class described, the combination of a supporting-frame, a hoisting-frame pivotally mounted thereon, and adapted to be raised and lowered, a conveyer-frame pivotally mounted on said supporting-frame and extending through said hoisting-frame, said conveyer-frame having a floor and sides rising above the floor, endless traveling elements having their upper leads disposed above the floor, transversely-disposed flights connecting said endless traveling elements, and sweeps attached to said flights and operating on said floor on the ascent of the upper leads of said endless traveling elements, and means to raise and lower one end of said conveyer-frame in said hoisting-frame, substantially as described.

In testimony that I claim the foregoing as my own I have hereto affixed my signature in the presence of two witnesses.

JOSEPH $\overset{\text{his}}{\times}$ FRANCOEUR.
mark

Witnesses:
 E. C. WHITCHER,
 J. C. ELLIOTT.